United States Patent
Ju et al.

(10) Patent No.: US 10,563,846 B2
(45) Date of Patent: Feb. 18, 2020

(54) CONNECTING DEVICE, LAMP AND LAMP ASSEMBLY SYSTEM

(71) Applicants: Radiant Opto-Electronics (Suzhou) Co., Ltd., Wujiang, Jiangsu (CN); Radiant Opto-Electronics Corporation, Kaohsiung (TW)

(72) Inventors: Chih-Hung Ju, Kaohsiung (TW); Guo-Hao Huang, Kaohsiung (TW)

(73) Assignees: RADIANT OPTO-ELECTRONICS (SUZHOU) CO., LTD., Wujiang, Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 16/185,112

(22) Filed: Nov. 9, 2018

(65) Prior Publication Data

US 2019/0078762 A1 Mar. 14, 2019

Related U.S. Application Data

(63) Continuation of application No. PCT/CN2017/099035, filed on Aug. 25, 2017.

(51) Int. Cl.
*F21V 17/02* (2006.01)
*F21V 8/00* (2006.01)
(Continued)

(52) U.S. Cl.
CPC ............... *F21V 17/02* (2013.01); *F21S 8/06* (2013.01); *F21V 17/12* (2013.01); *G02B 6/009* (2013.01);
(Continued)

(58) Field of Classification Search
CPC ....... G02B 6/0078; G02F 2001/133328; F21S 8/06; F21S 2/005; F21V 17/02
(Continued)

(56) References Cited

U.S. PATENT DOCUMENTS

| 4,726,781 A | 2/1988 | Bernhart et al. |
| 7,682,039 B2 | 3/2010 | Kuo et al. |

(Continued)

FOREIGN PATENT DOCUMENTS

| CN | 203880336 U | 10/2014 |
| CN | 204393977 U | 6/2015 |

(Continued)

*Primary Examiner* — William N Harris
(74) *Attorney, Agent, or Firm* — McClure, Qualey & Rodack, LLP

(57) ABSTRACT

A connecting device, a lamp and a lamp assembly system are described. The connecting device includes plural frames and at least one connecting unit. Each of the frames has a mounting space, and the frames are arranged along an assembling direction, and the mounting spaces of any two adjacent frames are communicated with each other. The connecting unit includes plural engagement assemblies, in which two of the engagement assemblies are respectively disposed in the mounting spaces of any two adjacent frames. Each of the engagement assemblies includes a base and an engaging member which is disposed on the base, and the engaging member of one of the two adjacent engagement assemblies is movable with respect to the other one of the two adjacent engagement assemblies along the assembling direction, so as to be fixed with the engaging member of the other one of the two adjacent engagement assemblies.

29 Claims, 14 Drawing Sheets

(51) Int. Cl.
*F21V 17/12* (2006.01)
*F21S 8/06* (2006.01)

(52) U.S. Cl.
CPC ......... *G02B 6/0078* (2013.01); *G02B 6/0088* (2013.01)

(58) Field of Classification Search
USPC .............................. 362/217.17, 217.14, 616
See application file for complete search history.

(56) References Cited

U.S. PATENT DOCUMENTS

| | | | | |
|---|---|---|---|---|
| 8,267,564 | B2* | 9/2012 | Kim | ........................ G09F 13/22 362/249.02 |
| 2009/0034243 | A1 | 2/2009 | Yaphe et al. | |
| 2013/0294061 | A1* | 11/2013 | Sorensen | .................. F21S 8/06 362/223 |
| 2014/0313776 | A1* | 10/2014 | Grigore | ................ G02B 6/0091 362/612 |
| 2014/0313778 | A1* | 10/2014 | Getzinger | ............ G02B 6/0078 362/613 |
| 2018/0039014 | A1 | 2/2018 | Ju et al. | |
| 2018/0341058 | A1* | 11/2018 | Grigore | ................ G02B 6/0078 |

FOREIGN PATENT DOCUMENTS

| | | |
|---|---|---|
| CN | 104900150 A | 9/2015 |
| CN | 104913169 A | 9/2015 |
| CN | 106286457 A | 1/2017 |
| CN | 206093375 U | 4/2017 |
| TW | I327205 B | 7/2010 |
| TW | I362452 B | 4/2012 |
| TW | I568969 B | 2/2017 |
| WO | 2014013369 A1 | 1/2014 |
| WO | 2014125311 A1 | 8/2014 |

* cited by examiner

CONNECTING DEVICE, LAMP AND LAMP ASSEMBLY SYSTEM

RELATED APPLICATIONS

This application is a continuation application of International Application No. PCT/CN2017/099035 filed on Aug. 25, 2017, which is incorporated herein by reference.

BACKGROUND

Field of Invention

The present invention relates to a connecting assembly. More particularly, the present invention relates to a connecting device, a lamp having the connecting device, and a lamp assembly system using the connecting device.

Description of Related Art

Lamps become more diversified to meet market requirements. One of conventional lamps is a hanging lamp which can be combined with another hanging lamp by using connecting members to form a larger or different sized illumination lamp.

However, the connecting members used in the conventional hanging lamp have greater thickness, and relatively complicated assembling process, thus not only failing to satisfy the design trend of thin-type lamp but also resulting in high manufacturing cost. Moreover, when multiple hanging lamps are combined together, their externally exposed wires result in a messy visual effect in a space.

SUMMARY

An object of the invention is to provide a connecting device, a lamp and a lamp assembly system, in which the connecting device is used to quickly assemble plural lamps, so as to form the lamp assembly system having simple appearance.

According to the aforementioned object, a connecting device is provided. The connecting device includes plural frames and at least one connecting unit. Each of the frames has a mounting space, and the frames are arranged along an assembling direction, and the mounting spaces of any two adjacent ones of the frames are communicated with each other. The connecting unit includes a first engagement assembly and a second engagement assembly. The first engagement assembly includes a first base and a first engaging member. The first base is disposed in the mounting space of a first frame of the frames. The first engaging member is disposed on the first base. The second engagement assembly includes a second base and a second engaging member. The second base is disposed in the mounting space of a second frame of the frames adjacent to the first frame. The second engaging member is disposed on the second base. One of the first engaging member and the second engaging member is movable with respect to the other one of the first engaging member and the second engaging member along the assembling direction, so as to be fixed with the other one of the first engaging member and the second engaging member.

According to an embodiment of the present invention, the first engagement assembly includes a first adjusting member, and the first adjusting member is rotatable with respect to a first axis to move the first engaging member along the assembling direction, so as to vary a relative position between the first engaging member and the first base along the assembling direction. The first axis is vertical to the assembling direction.

According to an embodiment of the present invention, the second engagement assembly includes a second adjusting member, and the second adjusting member is rotatable with respect to a second axis to move the second engaging member along the assembling direction, so as to vary a relative position between the second engaging member and the second base along the assembling direction. The second axis is vertical to the assembling direction.

According to an embodiment of the present invention, the first base has a first inclined surface, and the first adjusting member is screwed in the first engaging member, and one end of the first adjusting member is abutted against the first inclined surface of the first base. The second base has a second inclined surface, and the second adjusting member is screwed in the second engaging member, and one end of the second adjusting member is abutted against the second inclined surface of the second base.

According to an embodiment of the present invention, the first inclined surface and the second inclined surface extend along the assembling direction. a portion of each of the first inclined surface and the second inclined surface near an outer side of the frame is higher than another portion near an inner side of the frame.

According to an embodiment of the present invention, the first engagement assembly includes a first fixing structure fixed on the first base, and the first engaging member is slidably disposed between the first base and the first fixing structure. The second engagement assembly includes a second fixing structure fixed on the second base, and the second engaging member is slidably disposed between t the second base and the second fixing structure.

According to an embodiment of the present invention, the first base has a first inclined surface, and the first fixing structure has a first long slot, in which the first long slot has a long axis extending parallel to the assembling direction. The second base has a second inclined surface, and the second fixing structure has a second long slot, in which the second long slot has a long axis extending parallel to the assembling direction.

According to an embodiment of the present invention, the first engagement assembly includes a first adjusting member, and the second engagement assembly includes a second adjusting member. The first adjusting member extends through the first long slot and is screwed in the first engaging member, in which one end of the first adjusting member is abutted against the first inclined surface of the first base. The second adjusting member extends through the second long slot and is screwed in the second engaging member, in which one end of the second adjusting member is abutted against the second inclined surface of the second base.

According to an embodiment of the present invention, the first engaging member has an engaging hook, and the second engaging member has a through hole, and the engaging hook is engaged in the through hole.

According to an embodiment of the present invention, the connecting device further includes a first top cover and a second top cover. The first top cover covers the mounting space of the first frame, in which the first top cover has a first pressing block corresponding to a first elastic piece which is disposed on the first base, and the first elastic piece is deformable by the first pressing block. The second top cover covers the mounting space of the second frame adjacent to the first frame, in which the second top cover has a second pressing block corresponding to a second elastic piece which is disposed on the second base, and the second elastic piece is deformable by the second pressing block.

According to an embodiment of the present invention, the first top cover has a first engaging structure protruding from a bottom surface of the first top cover along a direction towards the first engagement assembly, and the first engaging structure is engaged with a first engaging portion of the first base, in which the first engaging structure and the first pressing block are located on different sides of the first top cover. The second top cover has a second engaging structure protruding from a bottom surface of the second top cover along a direction towards the second engagement assembly, and the second engaging structure is engaged with a second engaging portion of the second base, in which the second engaging structure and the second pressing block located on different sides of the second top cover.

According to an embodiment of the present invention, the connecting device further includes a first side cover and a second side cover. The first side cover is detachably disposed on a side of the one of the first frame, in which the first side cover has a first hook portion hooked on a first convex portion of the first base. The second top cover covers the mounting space of the second frame adjacent to the first frame, in which the second top cover has a second pressing block corresponding to a second elastic piece which is disposed on the second base, and the second elastic piece is deformable by the second pressing block.

According to an embodiment of the present invention, the first top cover has a first engaging structure protruding from a bottom surface of the first top cover along a direction towards the first engagement assembly, and the first engaging structure is engaged with a first engaging portion of the first base, in which the first engaging structure and the first pressing block are located on different sides of the first top cover. The second top cover has a second engaging structure protruding from a bottom surface of the second top cover along a direction towards the second engagement assembly, and the second engaging structure is engaged with a second engaging portion of the second base, in which the second engaging structure and the second pressing block located on different sides of the second top cover.

According to an embodiment of the present invention, the connecting device further includes a first side cover and a second side cover. The first side cover is detachably disposed on a side of the one of the first frame, in which the first side cover has a first hook portion hooked on a first convex portion of the first base. The second side cover is detachably disposed on a side of the second frame adjacent to the first frame, in which the second side cover has a second hook portion hooked on a second convex portion of the second base.

According to the aforementioned object, a connecting device is provided. The connecting device includes plural frames and at least one connecting unit. Each of the frames has a mounting space, and the frames are arranged along an assembling direction, and the mounting spaces of any two adjacent frames are communicated with each other. The connecting unit includes plural engagement assemblies, in which two of the engagement assemblies are respectively disposed in the mounting spaces of any two adjacent frames. Each of the engagement assemblies includes a base and an engaging member which is disposed on the base, and the engaging member of one of the two adjacent engagement assemblies is movable with respect to the other one of the two adjacent engagement assemblies along the assembling direction, so as to be fixed with the engaging member of the other one of the two adjacent engagement assemblies.

According to an embodiment of the present invention, each of the engagement assembly includes an adjusting member, and the adjusting member is rotatable with respect to an axis to move the engaging member along the assembling direction, so as to adjust a relative position between the engaging member and the base along the assembling direction. The axis is vertical to the assembling direction.

According to an embodiment of the present invention, the base has an inclined surface, and the adjusting member is screwed in the engaging member, and one end of the adjusting member is abutted against the inclined surface of the base.

According to an embodiment of the present invention, the inclined surface extends along the assembling direction. A portion of the inclined surface near an outer side of the frame is higher than another portion of the inclined surface near an inner side of the frame.

According to an embodiment of the present invention, each of the engagement assemblies includes a fixing structure fixed on the base, and the engaging member is slidably disposed between the base and the fixing structure.

According to an embodiment of the present invention, the base has an inclined surface, and each of the fixing structures has a first long slot, in which the long slot has a long axis extending parallel to the assembling direction.

According to an embodiment of the present invention, each of the engagement assemblies includes an adjusting member, in which the adjusting member extends through the long slot, and the adjusting member is screwed in the engaging member, and one end of the adjusting member is abutted against the inclined surface of the base.

According to an embodiment of the present invention, the engaging member of one of the two adjacent engagement assemblies has an engaging hook, and the engaging member of the other one of the two adjacent engagement assemblies has a through hole, and the engaging hook is engaged in the through hole.

According to an embodiment of the present invention, the connecting device further includes a top cover covering the mounting space of one of the frames, in which the top cover has a pressing block corresponding to an elastic piece which is disposed on the base, and the elastic piece is deformable by the pressing block.

According to an embodiment of the present invention, the top cover has an engaging structure protruding from a bottom surface of the top cover along a direction towards the engagement assembly, and the engaging structure is engaged with an engaging portion of the base, in which the engaging structure and the pressing block are located on different sides of the top cover.

According to an embodiment of the present invention, the connecting device further includes a side cover detachably disposed on a side of one of the frames, in which the side cover has a hook portion hooked on a convex portion of the base.

According to the aforementioned object, a lamp assembly system is provided. The lamp assembly system includes the aforementioned connecting device, plural light guide plates and plural light sources. The light guide plates are respectively disposed in the frames, in which each of the light guide plates has a light-incident surface. The light sources are respectively disposed adjacent to the light-incident surfaces of the light guide plates.

According to the aforementioned object, a lamp is provided. The lamp includes a frame, a light guide plate, a light source and an engagement assembly. The frame has a mounting space and an accommodating space, in which the mounting space has an access. The light guide plate is disposed in the accommodating space of the frame, in which the light guide plate has a light-incident surface. A light source is disposed adjacent to the light-incident surface of the light guide plate. An engagement assembly is disposed in the mounting space of the frame, in which the engagement assembly includes a base and an engaging member, and the engaging member is slidably disposed on the base, and the engaging member is movable to extend from the access and to be engaged with another lamp.

According to an embodiment of the present invention, the lamp further includes a side cover detachably disposed on the frame and covering the access of the mounting space, in which the side cover has a hook portion hooked on a convex portion of the base.

According to an embodiment of the present invention, the access of the mounting space is located on a side of the frame, and the mounting space has a top opening located above the frame. The lamp further comprises a top cover covering the top opening of the mounting space. The top cover has a pressing block corresponding to an elastic piece of the base, and the elastic piece is deformable by the pressing block.

According to an embodiment of the present invention, the top cover has an engaging structure protruding from a bottom surface of the top cover along a direction towards the engagement assembly, and the engaging structure is engaged with an engaging portion of the base, in which the engaging structure and the pressing block are located on different sides of the top cover.

According to the aforementioned embodiments of the present invention, the present invention uses the engagement assemblies to combine two adjacent lamps together, in which the engagement assemblies are respectively disposed inside the frames of the lamps. During the assembling process, the engaging member of the engagement assembly of each of two adjacent lamps is first moved out of the frame, such that the frames of the two adjacent lamps can be first connected conveniently. Thereafter, by rotating the adjusting members of the two adjacent lamps, the frames of the two adjacent lamps can be moved towards to each other until they are completely and tightly connected, thereby forming a lamp assembly system having a simple and concise appearance.

On the other hand, each of the frames of the present invention has a mounting space for receiving the engagement assembly, and thus two adjacent lamps can be connected by the engagement assemblies without changing the exterior appearance of the lamp assembly system. Furthermore, when multiple lamps are combined together, the mounting spaces of two adjacent frames communicate with each other, and thus the lamps may share a common cable in the frames, in which the common cable is connected to a single junction box, thereby reducing the number of cables and junction boxes and decreasing the overall cost of the lamps.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
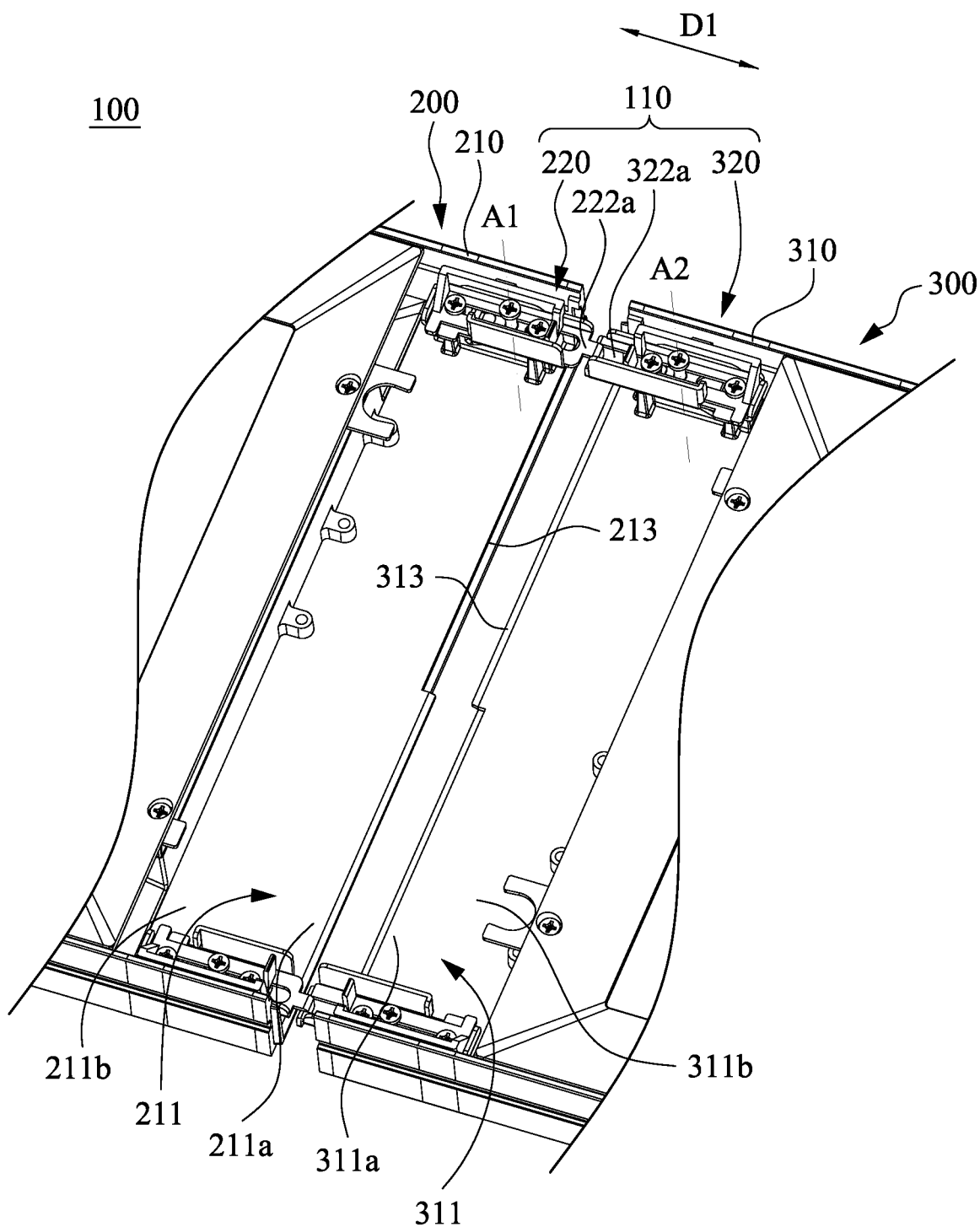
FIG. 1 is a schematic partial structural diagram showing a connecting device in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
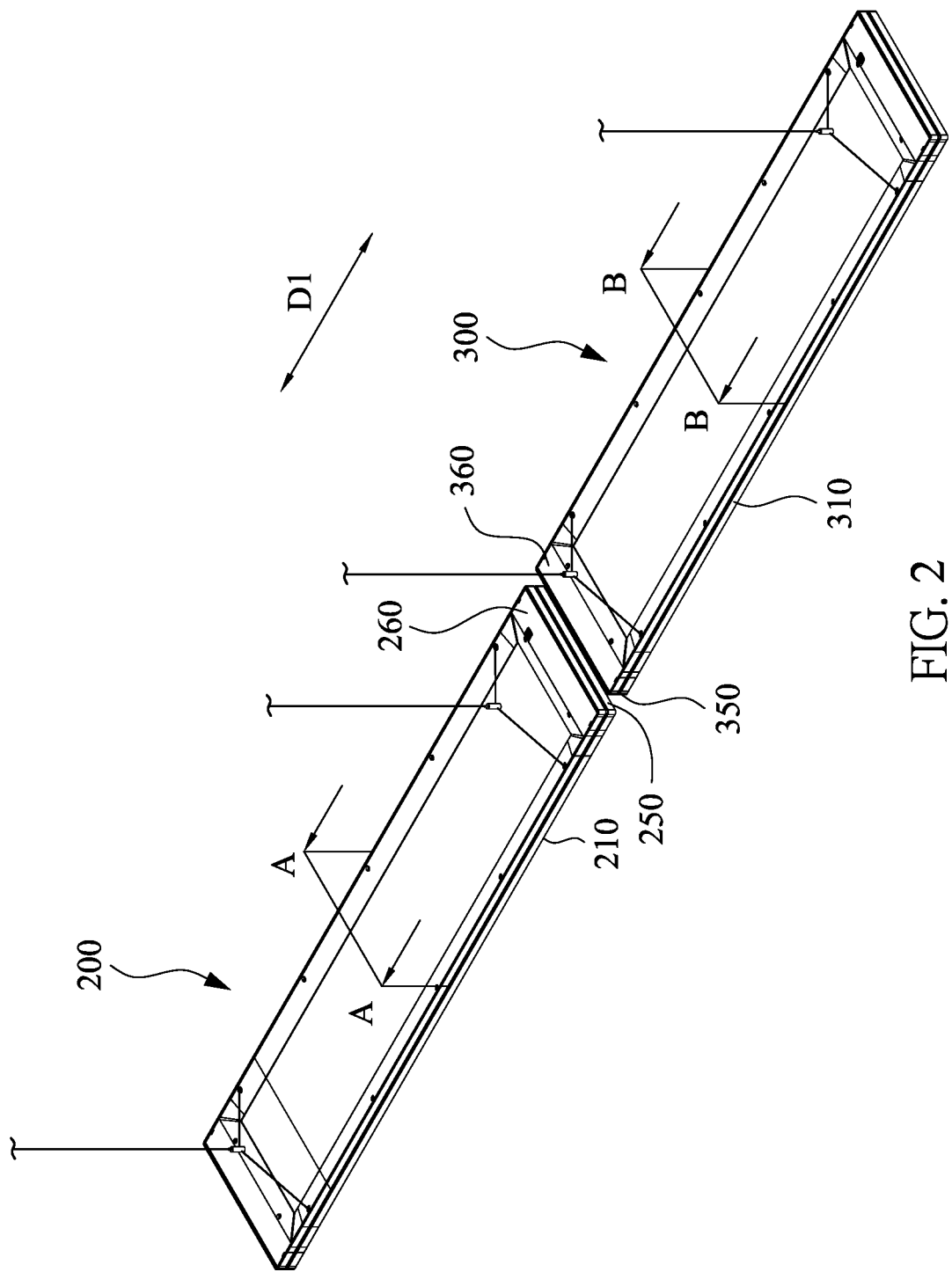
FIG. 2 is a schematic structural diagram showing two adjacent lamps which are not combined together in accordance with an embodiment of the present invention.
Figure 9:
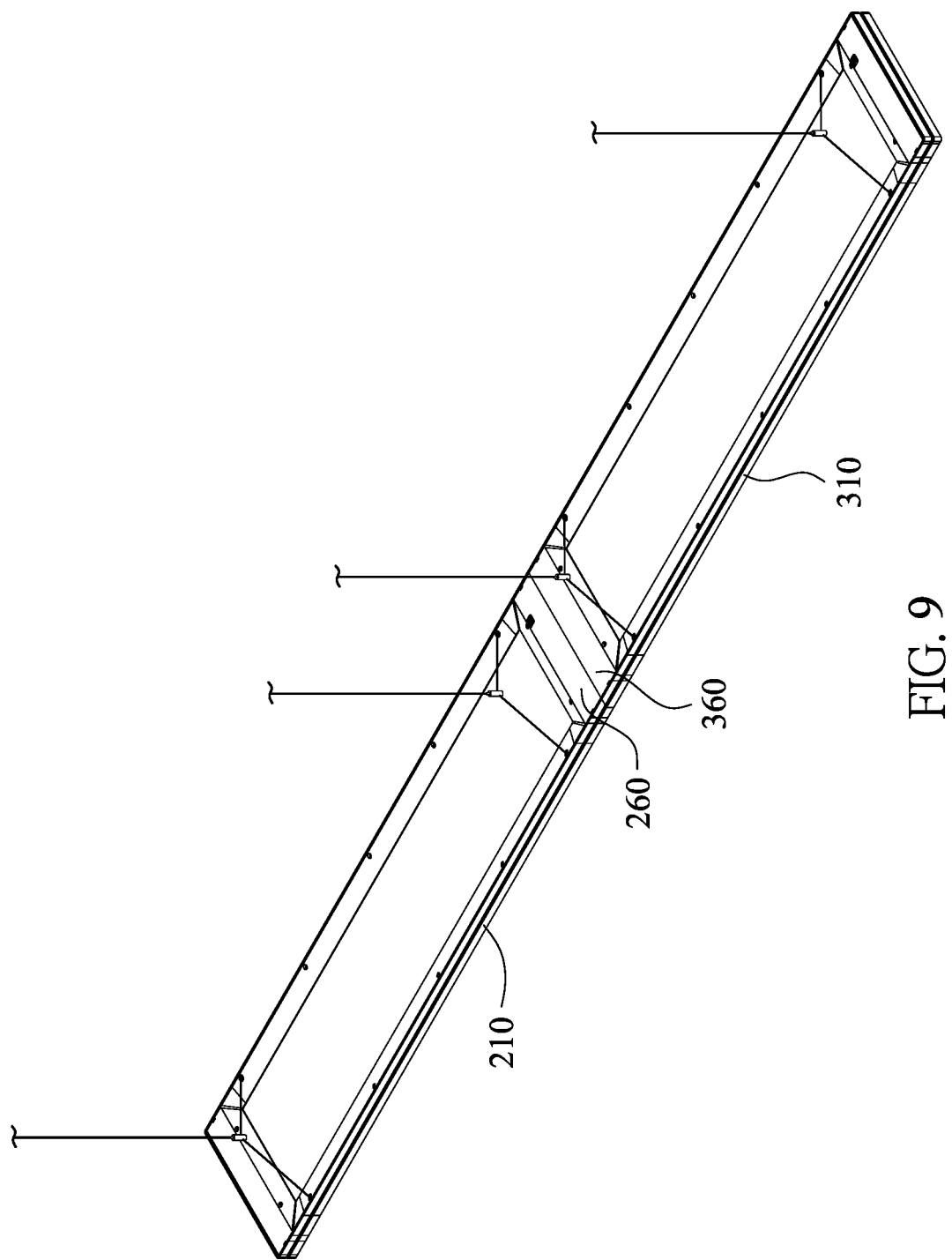
FIG. 9 is a schematic structural diagram showing a lamp assembly system in accordance with an embodiment of the present invention.

Referring to FIG. 1, FIG. 1 is a schematic partial structural diagram showing a connecting device 100 in accordance with an embodiment of the present invention. The connecting device 100 mainly includes plural frames (such as a frame 210 and a frame 310) and at least one connecting unit (such as connecting unit 110). The connecting unit 110 is mainly used to connect any two adjacent frames, such as the frame 210 and the frame 310. Referring to FIG. 2, FIG. 2 is a schematic structural diagram showing two adjacent lamps (such as a lamp 200 and a lamp 300) which are not combined together in accordance with an embodiment of the present invention. In the present embodiment, the aforementioned frame 210 refers to a frame of the lamp 200, and the aforementioned frame 310 refers to a frame of the lamp 300. In one present embodiment, the connecting unit 110 includes a first engagement assembly 220 disposed in the frame 210 and a second engagement assembly 320 disposed in the frame 310. Therefore, two adjacent lamp 200 and lamp 300 can be combined together by jointing the first engagement assembly 220 and the second engagement assembly 320, so as to form a lamp assembly system 400 (as shown in FIG. 9).

Figure 3:
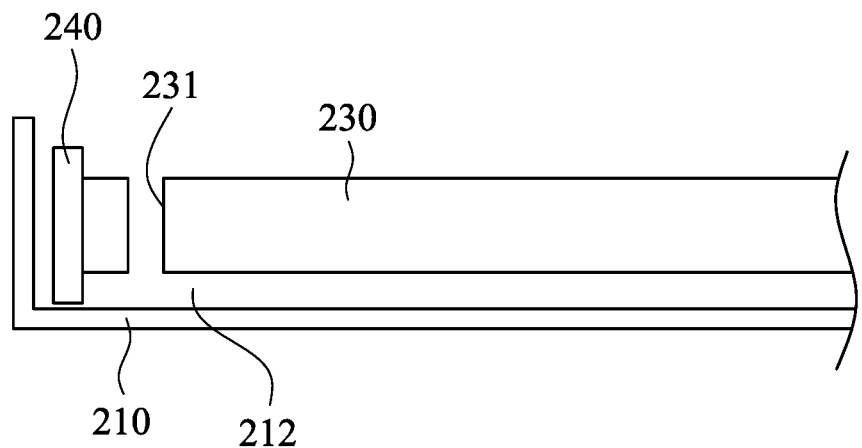
FIG. 3 is a schematic cross-sectional view taken along line A-A in FIG. 2.

Simultaneously referring to FIG. 1 to FIG. 3, in which FIG. 3 is a schematic cross-sectional view taken along line A-A in FIG. 2. The lamp 200 of the present embodiments mainly includes a frame 210, a first engagement assembly 220, a light guide plate 230, a light source 240, a first side cover 250 and a first top cover 260. In the present embodiment, the frame 210 has a mounting space 211 and an accommodating space 212. The first engagement assembly 220 is disposed in the mounting space 211. The light guide plate 230 and the light source 240 are disposed in the accommodating space 212, and the light source 240 is disposed adjacent to a light-incident surface 231 of the light guide plate 230. In the present embodiment, the mounting space 211 has an access 211a and a top opening 211b, in which the access 211a is located at a side of the frame 210, the top opening 211b is located above the frame 210. In the present embodiment, the first side cover 250 is used to cover the access 211a, and the first top cover 260 is used to cover the top opening 211b. Therefore, before the lamp 200 and the lamp 300 are combined together, the first side cover 250 and the first top cover 260 of the lamp 200 which are near the lamp 300 are first removed to expose the first engagement assembly 220 (as shown in FIG. 1), thereby engaging the first engagement assembly 220 of the lamp 200 to the second engagement assembly 320 of the lamp 300.

Figure 4:
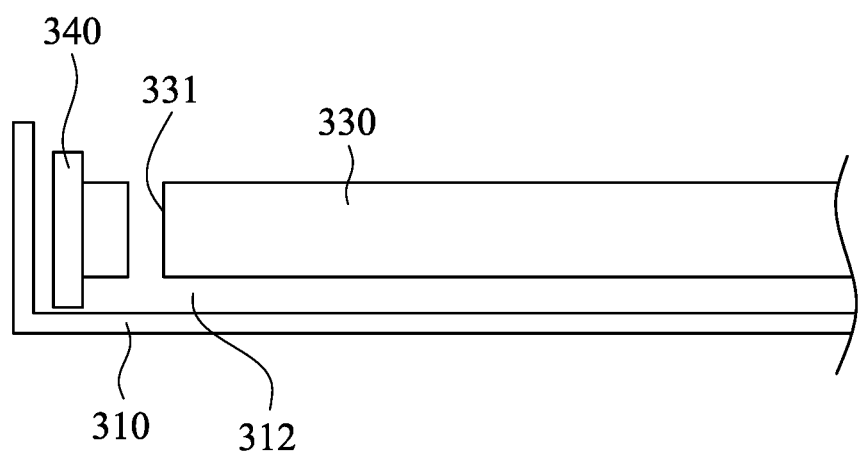
FIG. 4 is a schematic cross-sectional view taken along line B-B in FIG. 2.

Simultaneously referring to FIG. 1, FIG. 2 and FIG. 4, FIG. 4 is a schematic cross-sectional view taken along line B-B in FIG. 2. The lamp 300 of the present embodiments mainly includes a frame 310, a second engagement assembly 320, a light guide plate 330, a light source 340, a second side cover 350 and a second top cover 360. In the present embodiment, the frame 310 has a mounting space 311 and an accommodating space 312. The second engagement assembly 320 is disposed in the mounting space 311. The light guide plate 330 and the light source 340 are disposed in the accommodating space 312, and the light source 340 is disposed adjacent to a light-incident surface 331 of the light guide plate 330. In the present embodiment, the mounting space 311 has an access 311a and a top opening 311b, in which the access 311a is located at a side of the frame 310, the top opening 311b is located above the frame 310. In the present embodiment, the second side cover 350 is used to cover the access 311a, and the second top cover 360 is used to cover the top opening 311b. Therefore, before the lamp 300 and the lamp 200 are combined together, the second side cover 350 and the second top cover 360 of the lamp 300 which are near the lamp 200 are first removed to expose the second engagement assembly 320 (as shown in FIG. 1), thereby engaging the second engagement assembly 320 of the lamp 300 to the first engagement assembly 220 of the lamp 200.

It is noted that, the lamp 200 and the lamp 300 have substantially the same structures. In some embodiments, each of the lamp 200 and the lamp 300 has the first engagement assembly 220 as well as the second engagement assembly 320. Therefore, by jointing the first engagement assembly 220 of the lamp 200 to the second engagement assembly 320 of the lamp 300, or by jointing the second engagement assembly 320 of the lamp 200 to the first engagement assembly 220 of the lamp 300, the lamp 200 and the lamp 300 can be engaged together. In some embodiments, the lamp 200 only has one set of engagement assembly (such as first engagement assembly 220), and the lamp 300 has one set of engagement assembly (such as second engagement assembly 320). Therefore, the lamp 200 can be engaged with the lamp 300 by using its first engagement assembly 220 to be jointed with the second engagement assembly 320 of the lamp 300. It is noted that, the first engagement assembly 220 and the second engagement assembly 320 are substantially the same or corresponding engagement assembly.

Figure 5:
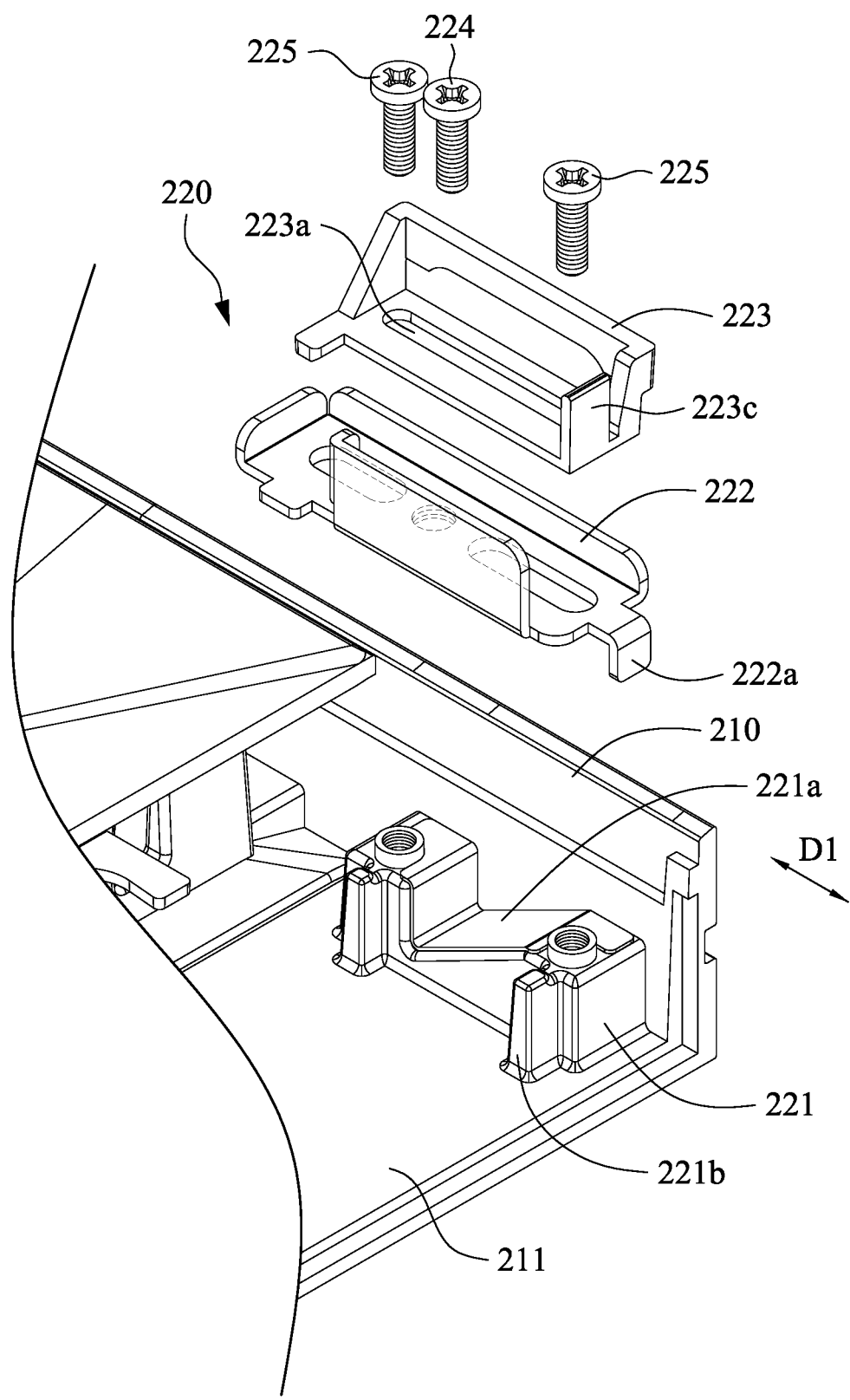
FIG. 5 is a schematic partial exploded view of a first engagement assembly of the connecting device in accordance with an embodiment of the present invention.

Referring to FIG. 1 and FIG. 5, FIG. 5 is a schematic partial exploded view of the first engagement assembly 220 of the connecting device in accordance with an embodiment of the present invention. In the present embodiment, the frame 210 of the lamp 200 and the frame 310 of the lamp 300 are arranged along the assembling direction D1. The first engagement assembly 220 of the present embodiment includes a first base 221, a first engaging member 222, a first fixing structure 223 and a first adjusting member 224. The first base 221 is disposed in the mounting space 211 of the frame 210. The first engaging member 222 is disposed on the first base 221, and the first engaging member 222 is movable along the assembling direction D1 towards or away from the lamp 300.

Referring to FIG. 1 and FIG. 5 again, in the present embodiment, the first engaging member 222 is located between the first fixing structure 223 and the first base 221, and the first fixing structure 223 is fixed on the first base 221 by the fixing members 225, so as to restrain the first engaging member 222 without limiting the movement of the first engaging member 222 along the assembling direction D1. In one embodiment, the first fixing structure 223 has a first long slot 223a, and a long axis of the first long slot 223a is parallel to the assembling direction D1. The first adjusting member 224 is inserted into the first long slot 223a along a first axis A1 and is screwed in the first engaging member 222, in which the first axis A1 is vertical to the assembling direction D1. Therefore, when the first adjusting member 224 is rotated with respect to the first axis A1, the first engaging member 222 is slid along the assembling direction D1, and a relative position between the first engaging member 222 and the first base 221 can be adjusted along the assembling direction D1.

Figure 6:
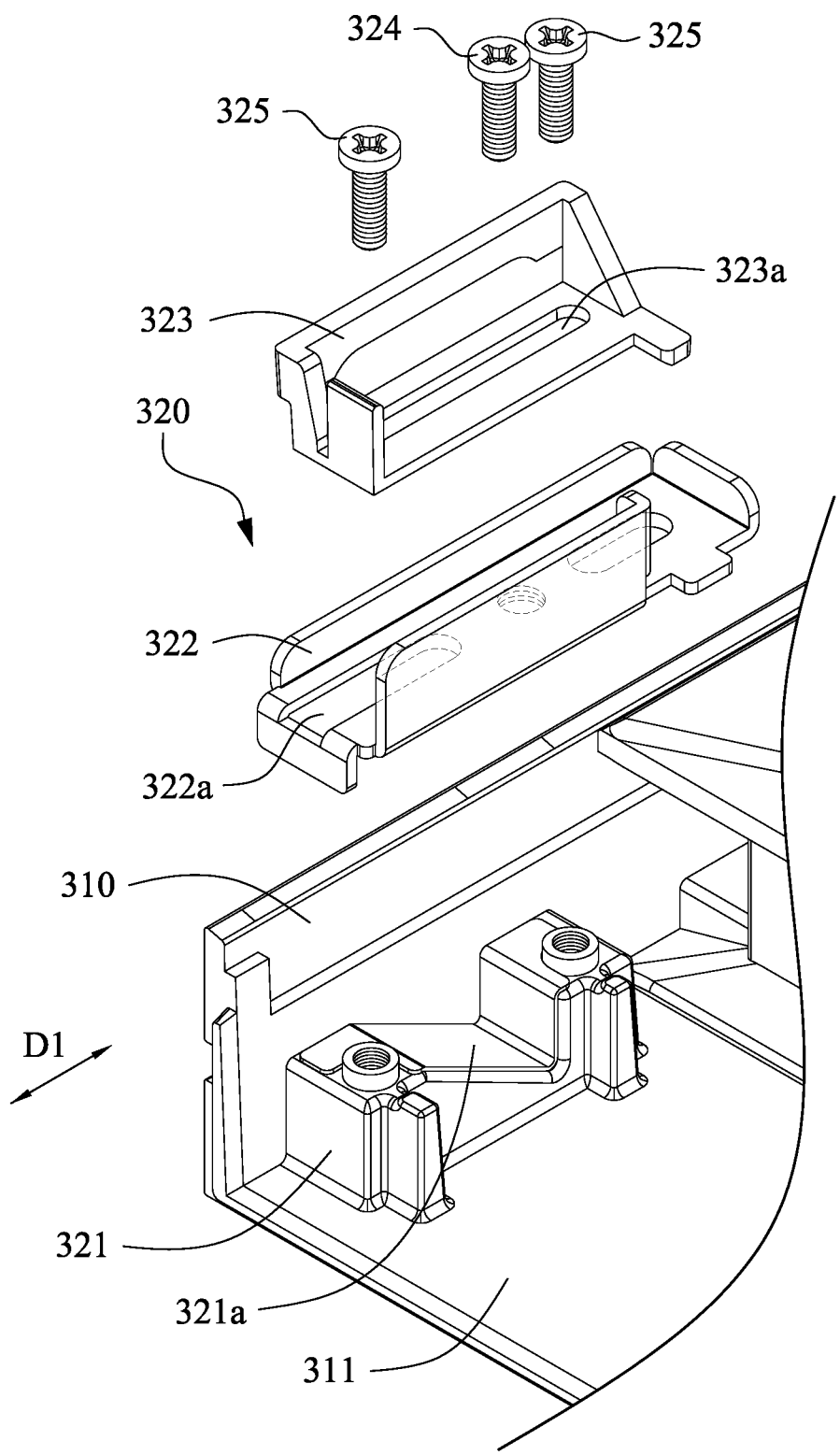
FIG. 6 is a schematic partial exploded view of a second engagement assembly of the connecting device in accordance with an embodiment of the present invention.

Simultaneously referring to FIG. 1 and FIG. 6, FIG. 6 is a schematic partial exploded view of the second engagement assembly 320 of the connecting device in accordance with an embodiment of the present invention. The second engagement assembly 320 includes a second base 321, a second engaging member 322, a second fixing structure 323 and a second adjusting member 324. The second base 321 is disposed in the mounting space 311 of the frame 310. The second engaging member 322 is disposed on the second base 221, and the second engaging member 322 is movable along the assembling direction D1 towards or away from the lamp 200.

Referring to FIG. 1 and FIG. 6 again, in the present embodiment, the second engaging member 322 is located between the second fixing structure 323 and the second base 321, and the second fixing structure 323 is fixed on the second base 321 by the fixing members 325, so as to restrain the second engaging member 322 without limiting the movement of the second engaging member 322 along the assembling direction D1. In one embodiment, the second fixing structure 323 has a second long slot 323a, and a long axis of the second long slot 323a is parallel to the assembling direction D1. The second adjusting member 324 is inserted into the second long slot 323a along a second axis A2 and is screwed in the second engaging member 322, in which the second axis A2 is vertical to the assembling direction D1. Therefore, when the second adjusting member 324 is rotated with respect to the second axis A2, the second engaging member 322 is slid along the assembling direction D1, and a relative position between the second engaging member 322 and the second base 321 can be adjusted along the assembling direction D1.

Simultaneously referring to FIG. 5 and FIG. 6, the first base 221 of the first engagement assembly 220 has a first inclined surface 221a. The first inclined surface 221a extends along the assembling direction D1, and a portion of the first inclined surface 221a near an outer side of the frame 210 is higher than a portion of the first inclined surface 221a near an inner side of the frame 210. Similarly, the second base 321 of the second engagement assembly 320 has a second inclined surface 321a. The second inclined surface 321a extends along the assembling direction D1, and a portion of the second inclined surface 321a near an outer side of the frame 310 is higher than a portion of the second inclined surface 321a near an inner side of the frame 310. In one embodiment, the first engaging member 222 has an engaging hook 222a, the second engaging member 322 has a through hole 322a. Therefore, the first engagement assembly 220 can be pre-connected to the second engagement assembly 320 by putting the engaging hook 222a in the through hole 322a (as shown in FIG. 1).

Figure 7:
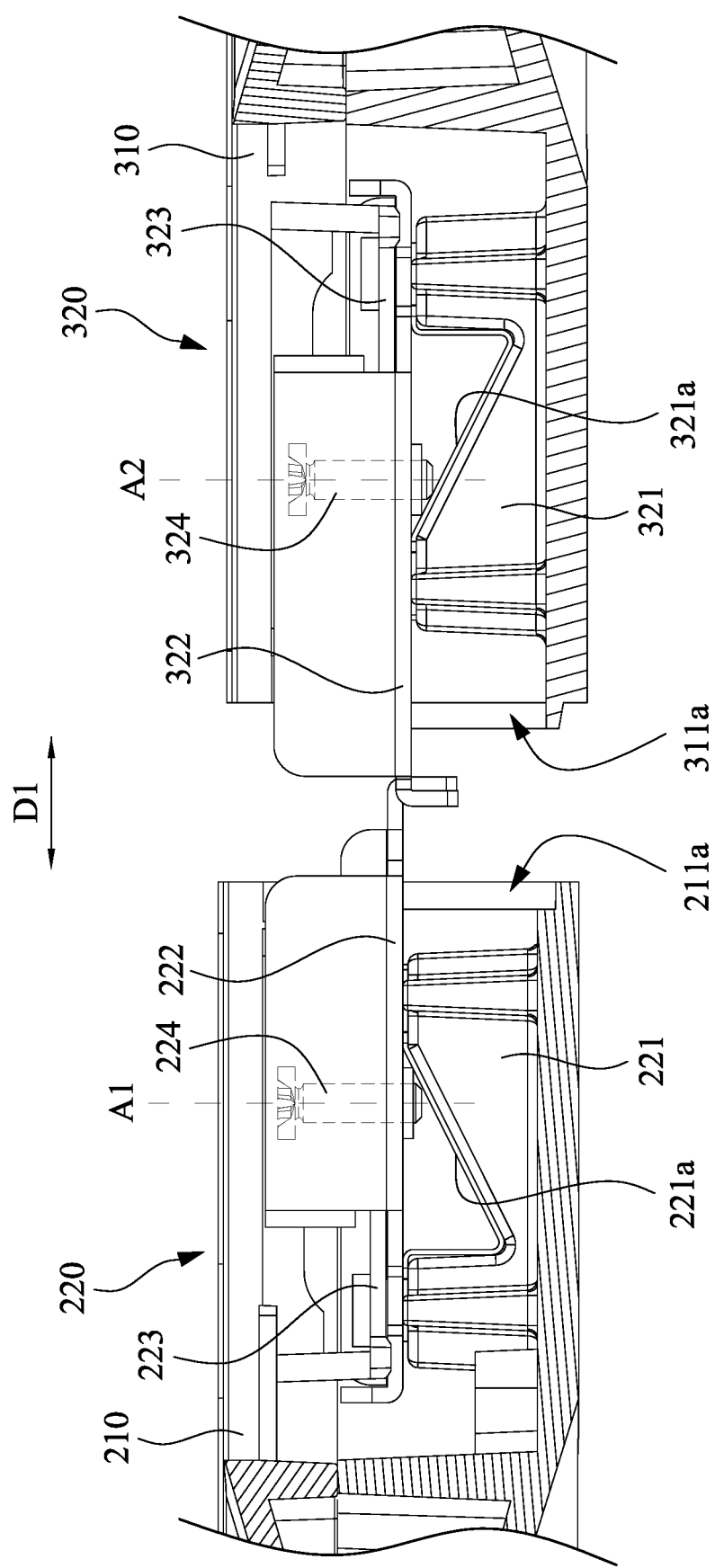
FIG. 7 is a schematic partial structural diagram showing a first engagement assembly and a second engagement assembly in a pre-connected state in accordance with an embodiment of the present invention.

Simultaneously referring to FIG. 1 and FIG. 7, FIG. 7 is a schematic partial structural diagram showing the first engagement assembly 220 and the second engagement assembly 320 in a pre-connected state in accordance with an embodiment of the present invention. When the first engagement assembly 220 and the second engagement assembly 320 are in the pre-connected state, a portion of the first engaging member 222 of the first engagement assembly 220 is located out of the access 211a of the frame 210, and one end of the first adjusting member 224 is abutted against a higher portion of the first inclined surface 221a. Similarly, a portion of the second engaging member 322 of the second engagement assembly 320 is located out of the access 311a of the frame 310, and one end of the second adjusting member 324 is abutted against a higher portion of the second inclined surface 321a. Meanwhile, there is a gap between the frame 210 of the lamp 200 and the frame 310 of the lamp 300.

Figure 8:
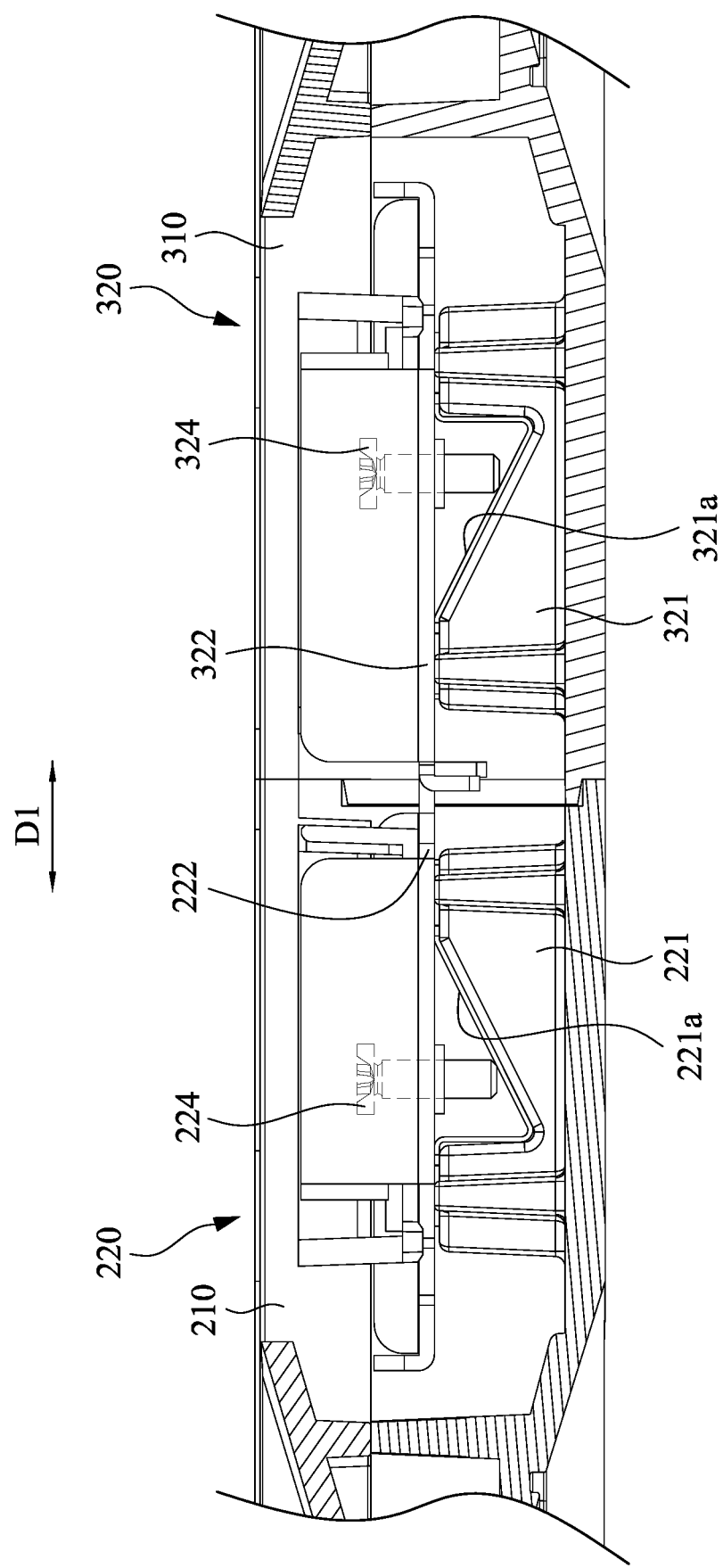
FIG. 8 is a schematic partial structural diagram showing a first engagement assembly and a second engagement assembly in a series-connected state in accordance with an embodiment of the present invention.

Referring to FIG. 8, FIG. 8 is a schematic partial structural diagram showing the first engagement assembly 220 and the second engagement assembly 320 in a series-connected state in accordance with an embodiment of the present invention. When the first adjusting member 224 is rotated with respect to the first axis A1 in a downward direction, the first adjusting member 224 is moved along the assembling direction D1 from a higher position of the first inclined surface 221a to a lower position of the first inclined surface 221a, thereby moving the first engaging member 222 towards the inner side of the frame 210. Similarly, when the second adjusting member 324 is rotated with respect to the second axis A2 in a downward direction, the second adjusting member 324 is moved along the assembling direction D1 from a higher position of the second inclined surface 321a to a lower position of the second inclined surface 321a, thereby moving the second engaging member 322 towards the inner side of the frame 310. When the first engagement assembly 220 and the second engagement assembly 320 are in the pre-connected state, the first engaging member 222 and the second engaging member 322 are already hooked to each other. Therefore, when the first engaging member 222 is moved towards the inner side of the frame 210, and the second engaging member 322 is moved towards the inner side of the frame 310, the frame 210 of the lamp 200 and the frame 310 of the lamp 300 are moved along the assembling direction D1 towards each other until the frame 210 and the frame 310 are completely combined together to form the lamp assembly system 400 as shown in FIG. 9.

Figure 10:
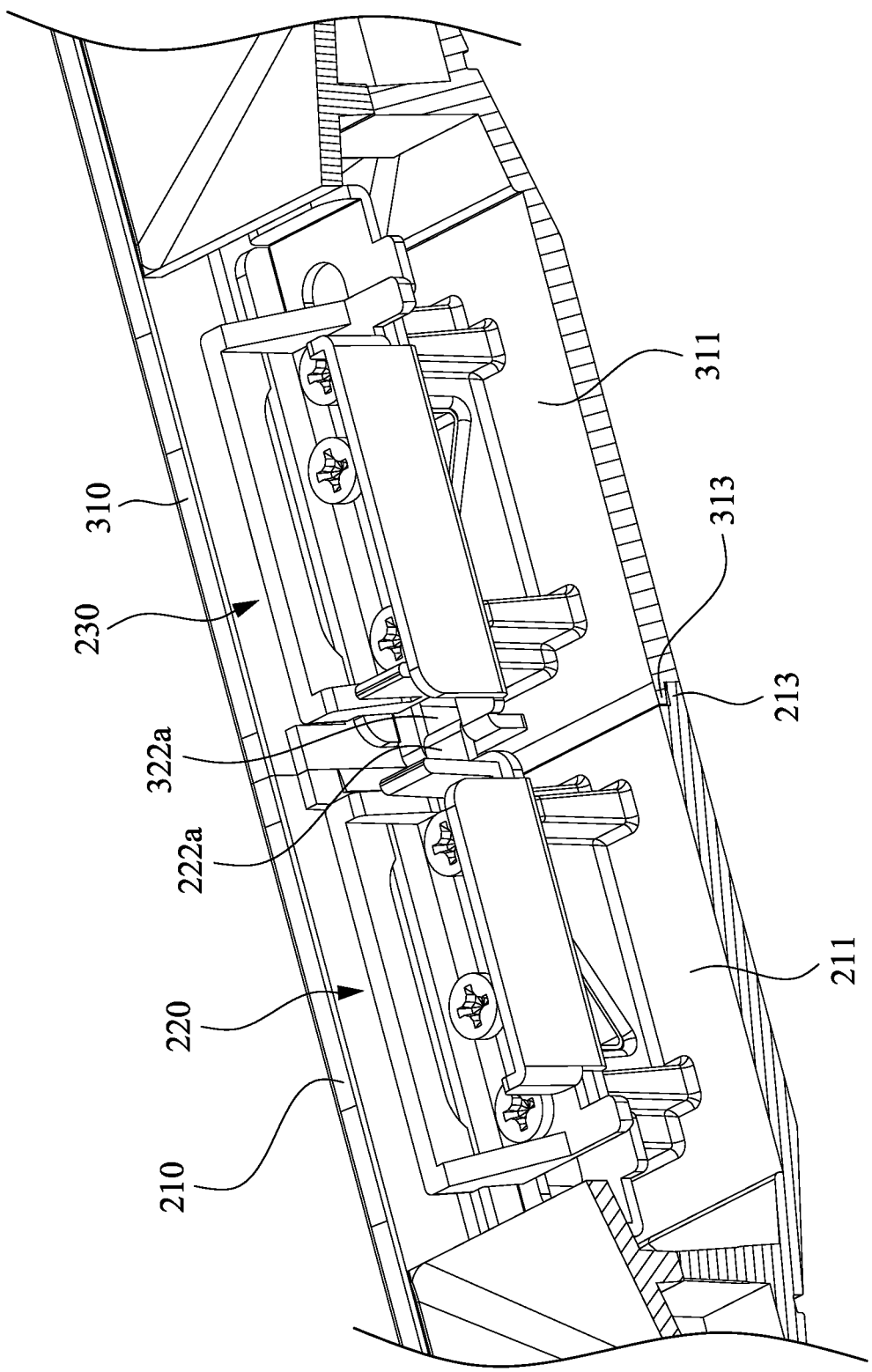
FIG. 10 is a schematic partial cross-sectional diagram showing an enlarged portion labeled with detail "A" in FIG. 9.

Referring to FIG. 9 and FIG. 10, FIG. 9 is a schematic structural diagram showing the lamp assembly system 400 in accordance with an embodiment of the present invention, and FIG. 10 is a schematic partial cross-sectional diagram showing an enlarged portion labeled with detail "A" in FIG. 9. As shown in FIG. 9 and FIG. 10, when the frame 210 and the frame 310 are completely combined together, the first engagement assembly 220 and the second engagement assembly 320 are respectively accommodated in the mounting space 211 and the mounting space 311. Therefore, by using the first top cover 260 to cover the mounting space 211 and by using the second top cover 360 to cover the mounting space 311, the first engagement assembly 220 and the second engagement assembly 320 can be completely hidden inside the lamp assembly system 400, thereby simplifying the appearance of the lamp assembly system 400. As shown in FIG. 10, in some embodiments, the frame 210 has a first combining structure 213 and the frame 310 has a second combining structure 313 complementary to the first combining structure 213. When the frame 210 and the frame 310 are combined together, the first combining structure 213 and the second combining structure 313 can be engaged together, thereby increasing engagement stability between the frame 210 and the frame 310.

Figure 11:
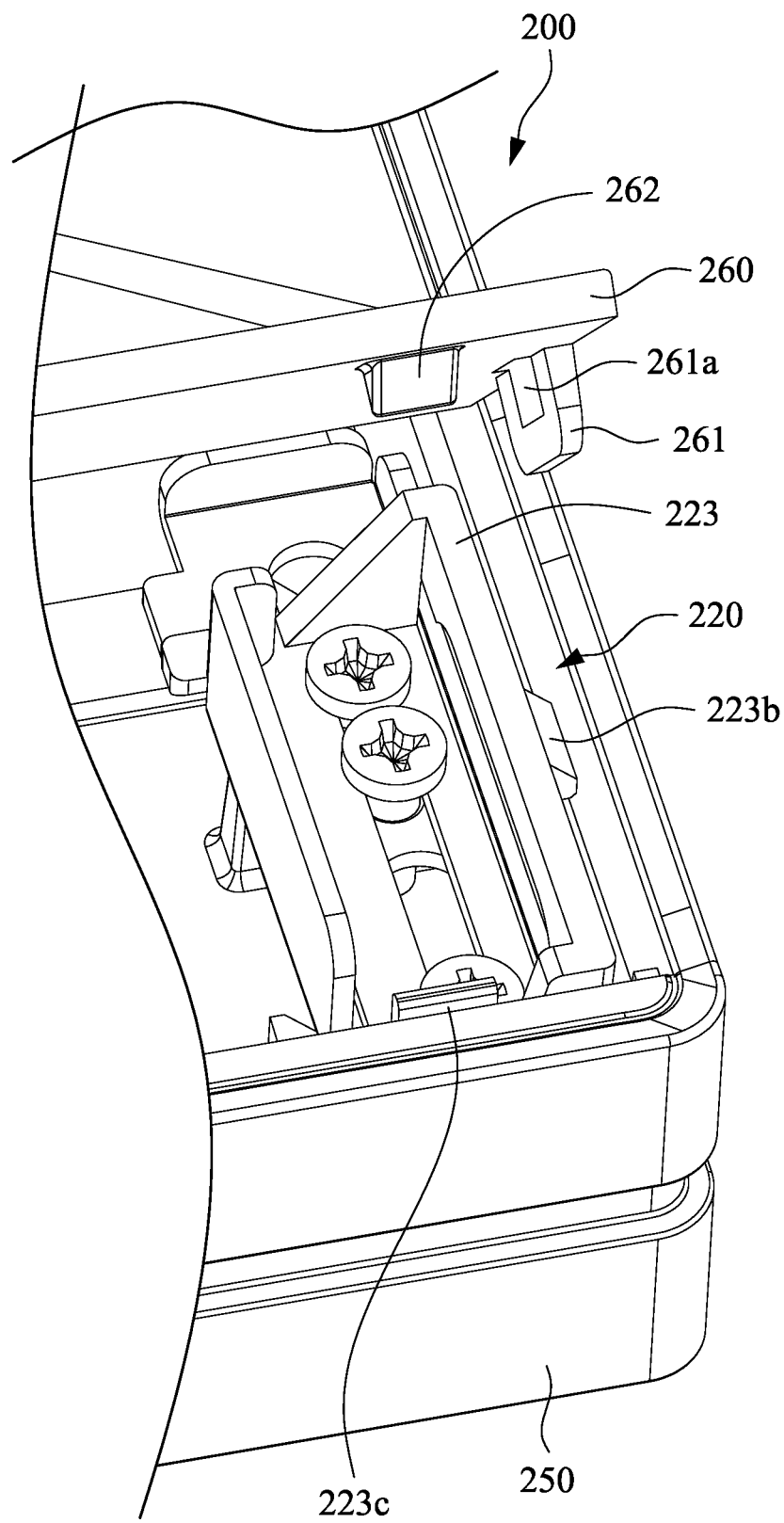
FIG. 11 is a schematic partial structural diagram showing a first top cover in an open state in accordance with an embodiment of the present invention.
Figure 12:
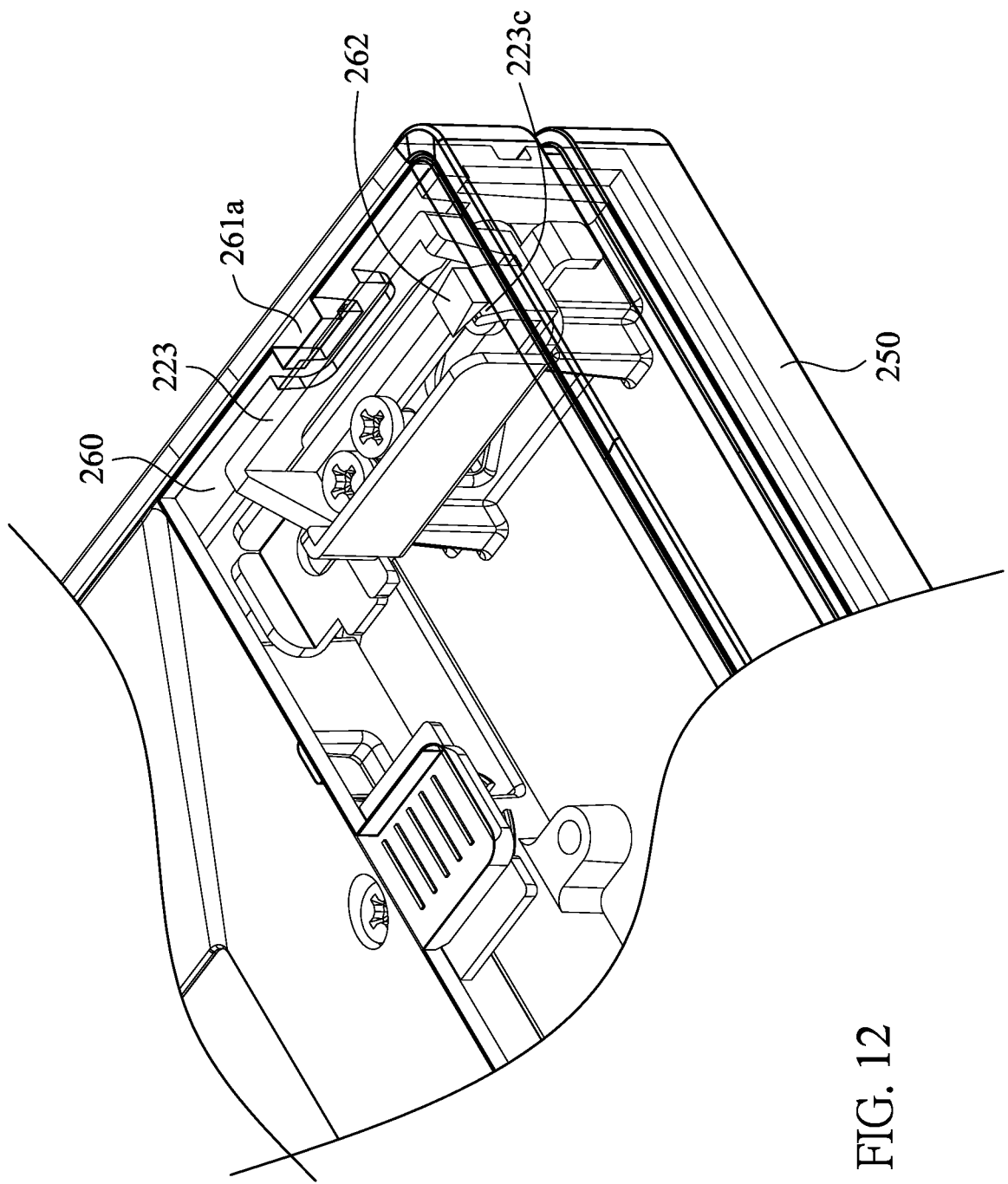
FIG. 12 is a schematic partial structural diagram showing a first top cover in a closed state in accordance with an embodiment of the present invention.
Figure 13:
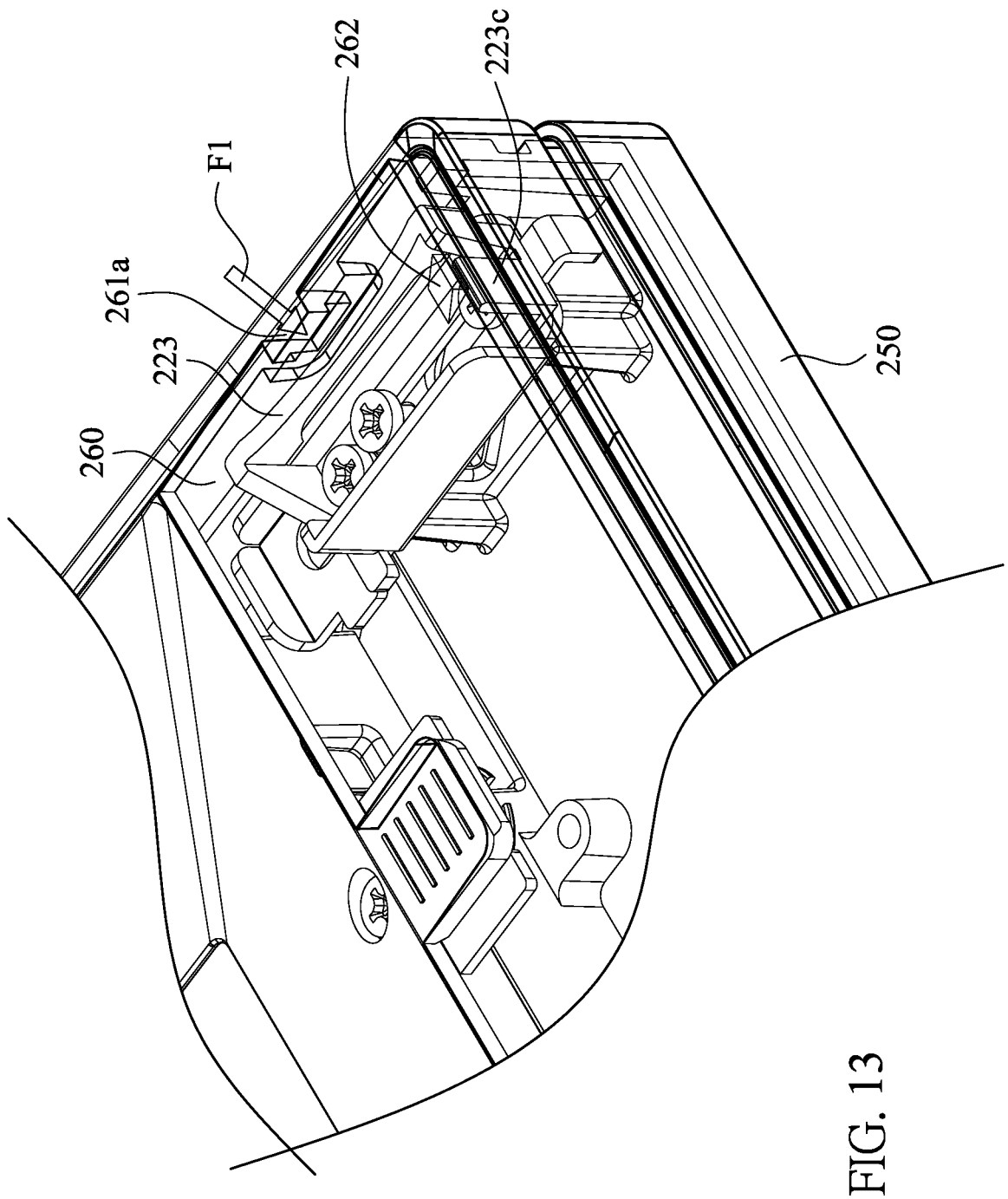
FIG. 13 is a schematic partial structural diagram showing a first fixing structure is in a deformed state in accordance with an embodiment of the present invention.

Referring to FIG. 11 to FIG. 13, in which FIG. 11 and FIG. 12 are schematic partial structural diagrams respectively showing the first top cover 260 in an open state and a closed state in accordance with an embodiment of the present invention, and FIG. 13 is a schematic partial structural diagram showing the first fixing structure 223 is in a deformed state in accordance with an embodiment of the present invention. In the present embodiment, as shown in FIG. 11, the first top cover 260 of the lamp 200 has a first engaging structure 261 and a first pressing block 262 respectively disposed on different sides of the first top cover 260. In addition, the first fixing structure 223 of the first engagement assembly 220 has a first engaging portion 223b and a first elastic piece 223c respectively corresponding to the first engaging structure 261 and the first pressing block 262 of the first top cover 260. As shown in FIG. 11, the first engaging structure 261 protrudes from a bottom surface of the first top cover 260 towards the first engagement assembly 220. As shown in FIG. 12, when the first top cover 260 covers the first engagement assembly 220, the first engaging structure 261 is engaged with the first engaging portion 223b of the first fixing structure 223, and the first pressing block 262 presses the first elastic piece 223c to deform the first elastic piece 223c. In one example, the first engaging portion 223b is a convex structure, and the first engaging structure 261 has a through hole 261a corresponding to the convex structure and passing through a top surface of the first top cover 260. Therefore, when the first top cover 260 needs to be opened, a tool (such as a flathead screwdriver) may be inserted into the through hole 261a from the top surface of the first top cover 260, such that a side portion of the first fixing structure 223 is deformed by a force F1 applied by the tool, thereby disassembling the first engaging structure 261 from the first engaging portion 223b. Meanwhile, the first top cover 260 is elastically opened by an elastic recovery force generated from the deformed first elastic piece 223c. It is noted that, the structural design and the operation manner of the second top cover 360 shown in FIG. 2 are similar to those of the first top cover 260 and will not be described again herein.

Figure 14:
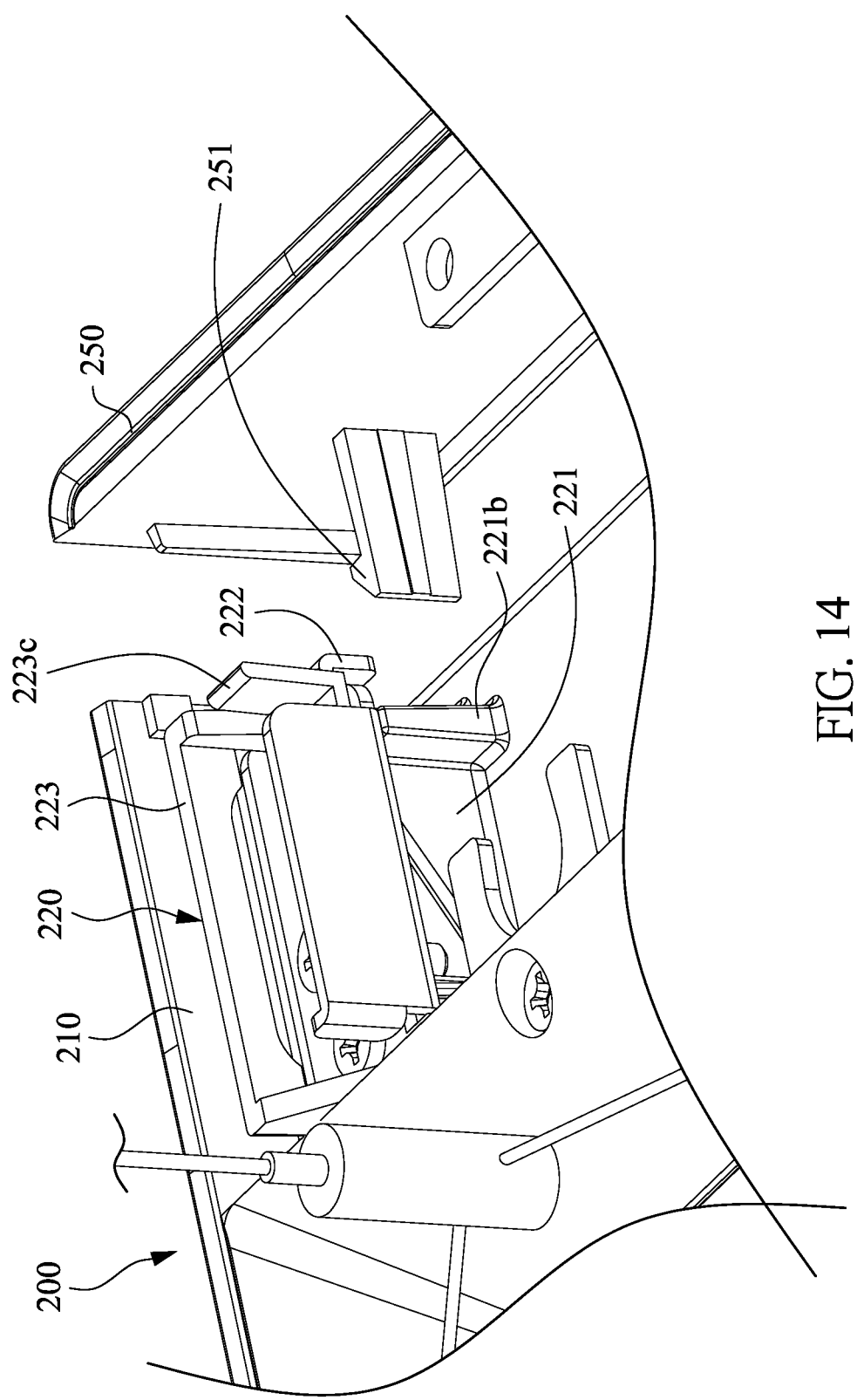
FIG. 14 is a schematic partial structural diagram showing a first side cover in a removed state.
Figure 15:
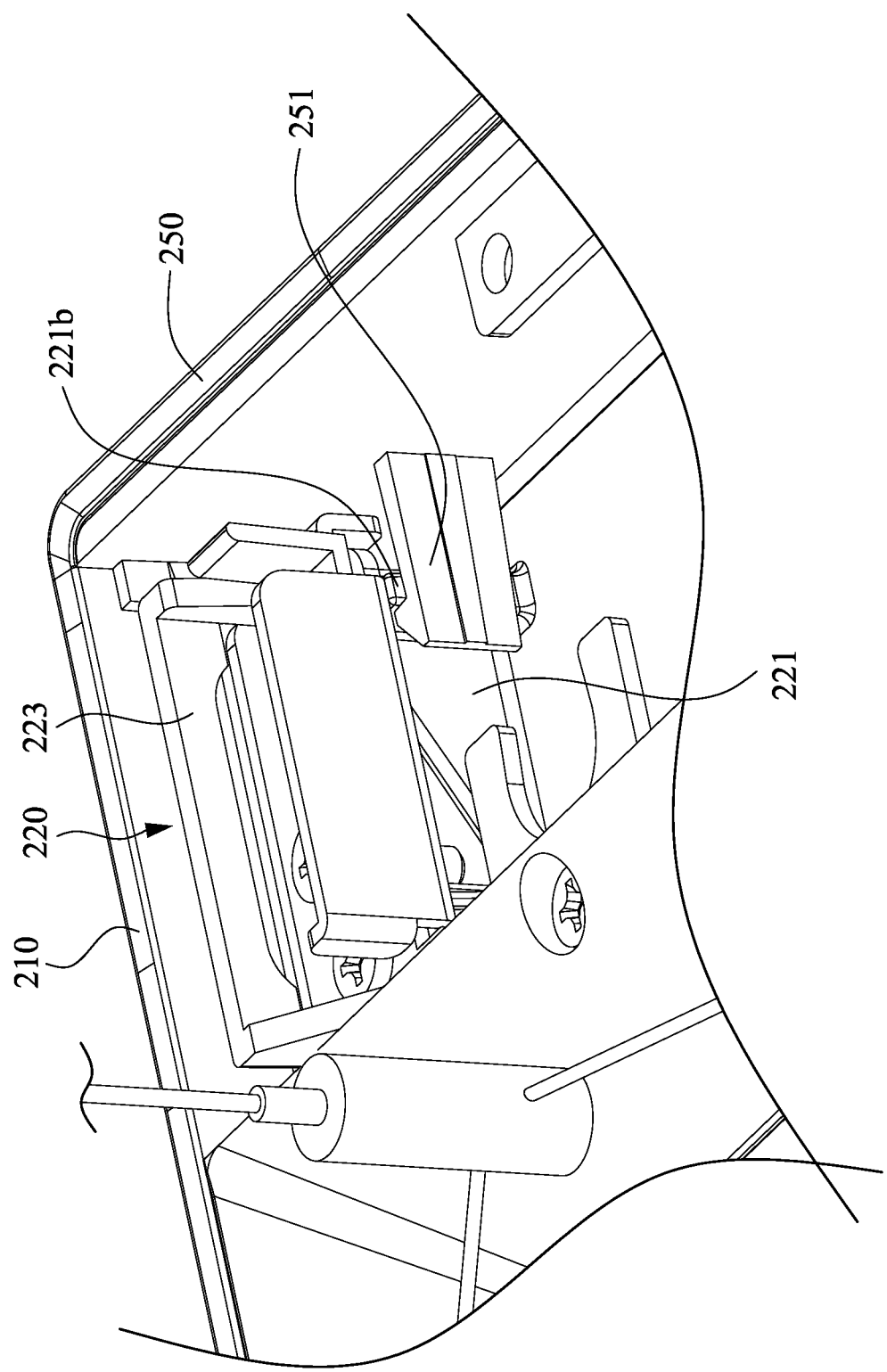
FIG. 15 is a schematic partial structural diagram showing a first side cover which is fixed on the frame.

Referring to FIG. 14 and FIG. 15, FIG. 14 is a schematic partial structural diagram showing the first side cover 250 in a removed state, and FIG. 15 is a schematic partial structural diagram showing the first side cover 250 which is fixed on the frame 210. In the present embodiment, the first side cover 250 has a first hook portion 251, and the first base 221 has a first convex portion 221b. Therefore, the first side cover 250 can be fixed on the frame 210 by hooking the first hook portion on the first convex portion 221b. Operators can use a tool to separate the first hook portion 251 from the convex portion 221b to remove the first side cover 250. It is noted that, the structural design and the operation manner of the second side cover 350 are similar to those of the first side cover 250 and will not be described again herein.

According to the aforementioned embodiments of the present invention, the present invention uses the engagement assemblies to combine two adjacent lamps together, in which the engagement assemblies are respectively disposed inside the frames of the lamps. During the assembling process, the engaging member of the engagement assembly of each of two adjacent lamps is first moved out of the frame, such that the frames of the two adjacent lamps can be first connected conveniently. Thereafter, by rotating the adjusting members of the two adjacent lamps, the frames of the two adjacent lamps can be moved towards to each other until they are completely and tightly connected, thereby forming a lamp assembly system having a simple and concise appearance.

On the other hand, each of the frames of the present invention has a mounting space for receiving the engagement assembly, and thus two adjacent lamps can be connected by the engagement assemblies without changing the exterior appearance of the lamp assembly system. Furthermore, when multiple lamps are combined together, the mounting spaces of two adjacent frames communicate with each other, and thus the lamps may share a common cable in the frames, in which the common cable is connected to a single junction box, thereby reducing the number of cables and junction boxes and decreasing the overall cost of the lamps.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A connecting device, comprising:
a plurality of frames, wherein each of the frames has a mounting space, and the frames are arranged along an assembling direction, and the mounting spaces of any two adjacent ones of the frames are communicated with each other; and
at least one connecting unit, comprising:
a first engagement assembly, comprising:
a first base disposed in the mounting space of a first frame of the frames; and
a first engaging member disposed on the first base; and
a second engagement assembly, comprising:
a second base disposed in the mounting space of a second frame of the frames adjacent to the first frame;
a second engaging member disposed on the second base;
wherein one of the first engaging member and the second engaging member is movable with respect to the other one of the first engaging member and the second engaging member along the assembling direction, so as to be fixed with the other one of the first engaging member and the second engaging member.

2. The connecting device of claim 1, wherein
the first engagement assembly comprises a first adjusting member, and the first adjusting member is rotatable with respect to a first axis to move the first engaging member along the assembling direction, so as to vary a relative position between the first engaging member and the first base along the assembling direction; and
the first axis is vertical to the assembling direction.

3. The connecting device of claim 2, wherein
the second engagement assembly comprises a second adjusting member, and the second adjusting member is rotatable with respect to a second axis to move the second engaging member along the assembling direction, so as to vary a relative position between the second engaging member and the second base along the assembling direction; and
the second axis is vertical to the assembling direction.

4. The connecting device of claim 3, wherein
the first base has a first inclined surface, and the first adjusting member is screwed in the first engaging member, and one end of the first adjusting member is abutted against the first inclined surface of the first base; and
the second base has a second inclined surface, and the second adjusting member is screwed in the second engaging member, and one end of the second adjusting member is abutted against the second inclined surface of the second base.

5. The connecting device of claim 4, wherein
the first inclined surface and the second inclined surface extend along the assembling direction; and
a portion of each of the first inclined surface and the second inclined surface near an outer side of the frame is higher than another portion near an inner side of the frame.

6. The connecting device of claim 1, wherein
the first engagement assembly comprises a first fixing structure fixed on the first base, and the first engaging member is slidably disposed between the first base and the first fixing structure; and
the second engagement assembly comprises a second fixing structure fixed on the second base, and the second engaging member is slidably disposed between the second base and the second fixing structure.

7. The connecting device of claim 6, wherein
the first base has a first inclined surface, and the first fixing structure has a first long slot, wherein the first long slot has a long axis extending parallel to the assembling direction; and
the second base has a second inclined surface, and the second fixing structure has a second long slot, wherein the second long slot has a long axis extending parallel to the assembling direction.

8. The connecting device of claim 7, wherein
the first engagement assembly comprises a first adjusting member, and the second engagement assembly comprises a second adjusting member;
the first adjusting member extends through the first long slot and is screwed in the first engaging member, wherein one end of the first adjusting member is abutted against the first inclined surface of the first base; and the second adjusting member extends through the second long slot and is screwed in the second engaging member, wherein one end of the second adjusting member is abutted against the second inclined surface of the second base.

9. The connecting device of claim 1, wherein the first engaging member has an engaging hook, and the second engaging member has a through hole, and the engaging hook is engaged in the through hole.

10. The connecting device of claim 1, further comprising:
a first top cover covering the mounting space of the first frame, wherein the first top cover has a first pressing block corresponding to a first elastic piece which is disposed on the first base, and the first elastic piece is deformable by the first pressing block; and
a second top cover covering the mounting space of the second frame adjacent to the first frame, wherein the second top cover has a second pressing block corresponding to a second elastic piece which is disposed on the second base, and the second elastic piece is deformable by the second pressing block.

11. The connecting device of claim 10, wherein
the first top cover has a first engaging structure protruding from a bottom surface of the first top cover along a direction towards the first engagement assembly, and the first engaging structure is engaged with a first engaging portion of the first base, wherein the first engaging structure and the first pressing block are located on different sides of the first top cover;
the second top cover has a second engaging structure protruding from a bottom surface of the second top cover along a direction towards the second engagement assembly, and the second engaging structure is engaged with a second engaging portion of the second base, wherein the second engaging structure and the second pressing block located on different sides of the second top cover.

12. The connecting device of claim 1, further comprising:
a first side cover detachably disposed on a side of the one of the first frame, wherein the first side cover has a first hook portion hooked on a first convex portion of the first base; and
a second side cover, detachably disposed on a side of the second frame adjacent to the first frame, wherein the second side cover has a second hook portion hooked on a second convex portion of the second base.

13. A lamp assembly system, comprising:
a connecting device of claim 1;
a plurality of light guide plates respectively disposed in the frames, wherein each of the light guide plates has a light-incident surface; and
a plurality of light sources respectively disposed adjacent to the light-incident surfaces of the light guide plates.

14. A connecting device, comprising:
a plurality of frames, wherein each of the frames has a mounting space, and the frames are arranged along an assembling direction, and the mounting spaces of any two adjacent frames are communicated with each other; and
at least one connecting unit comprising a plurality of engagement assemblies, wherein two of the engagement assemblies are respectively disposed in the mounting spaces of any two adjacent frames;

wherein each of the engagement assemblies comprises a base and an engaging member which is disposed on the base, the engaging member of one of the two adjacent engagement assemblies is movable with respect to the other one of the two adjacent engagement assemblies along the assembling direction, so as to be fixed with the engaging member of the other one of the two adjacent engagement assemblies.

15. The connecting device of claim 14, wherein
each of the engagement assembly comprises an adjusting member, and the adjusting member is rotatable with respect to an axis to move the engaging member along the assembling direction, so as to adjust a relative position between the engaging member and the base along the assembling direction; and
wherein the axis is vertical to the assembling direction.

16. The connecting device of claim 15, wherein the base has an inclined surface, and the adjusting member is screwed in the engaging member, and one end of the adjusting member is abutted against the inclined surface of the base.

17. The connecting device of claim 16, wherein
the inclined surface extends along the assembling direction; and
a portion of the inclined surface near an outer side of the frame is higher than another portion of the inclined surface near an inner side of the frame.

18. The connecting device of claim 14, wherein each of the engagement assemblies comprises a fixing structure fixed on the base, and the engaging member is slidably disposed between the base and the fixing structure.

19. The connecting device of claim 18, wherein
the base has an inclined surface, and each of the fixing structures has a first long slot, wherein the long slot has a long axis extending parallel to the assembling direction.

20. The connecting device of claim 19, wherein
each of the engagement assemblies comprises an adjusting member, wherein the adjusting member extends through the long slot, and the adjusting member is screwed in the engaging member, and one end of the adjusting member is abutted against the inclined surface of the base.

21. The connecting device of claim 14, wherein the engaging member of one of the two adjacent engagement assemblies has an engaging hook, and the engaging member of the other one of the two adjacent engagement assemblies has a through hole, and the engaging hook is engaged in the through hole.

22. The connecting device of claim 14, further comprising a top cover covering the mounting space of one of the frames, wherein the top cover has a pressing block corresponding to an elastic piece which is disposed on the base, and the elastic piece is deformable by the pressing block.

23. The connecting device of claim 22, wherein the top cover has an engaging structure protruding from a bottom surface of the top cover along a direction towards the engagement assembly, and the engaging structure is engaged with an engaging portion of the base, wherein the engaging structure and the pressing block are located on different sides of the top cover.

24. The connecting device of claim 14, further comprising a side cover detachably disposed on a side of one of the frames, wherein the side cover has a hook portion hooked on a convex portion of the base.

25. A lamp assembly system, comprising:
a connecting device of claim 14;

a plurality of light guide plates respectively disposed in the frames, wherein each of the light guide plates has a light-incident surface; and a plurality of light sources disposed respectively adjacent to the light-incident surfaces of the light guide plates.

26. A lamp, comprising:

a frame having a mounting space and an accommodating space, wherein the mounting space has an access;

a light guide plate disposed in the accommodating space of the frame, wherein the light guide plate has a light-incident surface;

a light source disposed adjacent to the light-incident surface of the light guide plate; and an engagement assembly disposed in the mounting space of the frame, wherein the engagement assembly comprises a base and an engaging member, and the engaging member is slidably disposed on the base, and the engaging member is movable to extend from the access and to be engaged with another lamp.

27. The lamp of claim 26, further comprising a side cover detachably disposed on the frame and covering the access of the mounting space, wherein the side cover has a hook portion hooked on a convex portion of the base.

28. The lamp of claim 26, wherein the access of the mounting space is located on a side of the frame, and the mounting space has a top opening located above the frame;

the lamp further comprises a top cover covering the top opening of the mounting space; and the top cover has a pressing block corresponding to an elastic piece of the base, and the elastic piece is deformable by the pressing block.

29. The lamp of claim 28, wherein the top cover has an engaging structure protruding from a bottom surface of the top cover along a direction towards the engagement assembly, and the engaging structure is engaged with an engaging portion of the base, wherein the engaging structure and the pressing block are located on different sides of the top cover.

* * * * *